INVENTOR
JOHN T. PARSONS
BY
ATTORNEY

INVENTOR
JOHN T. PARSONS
BY
ATTORNEY

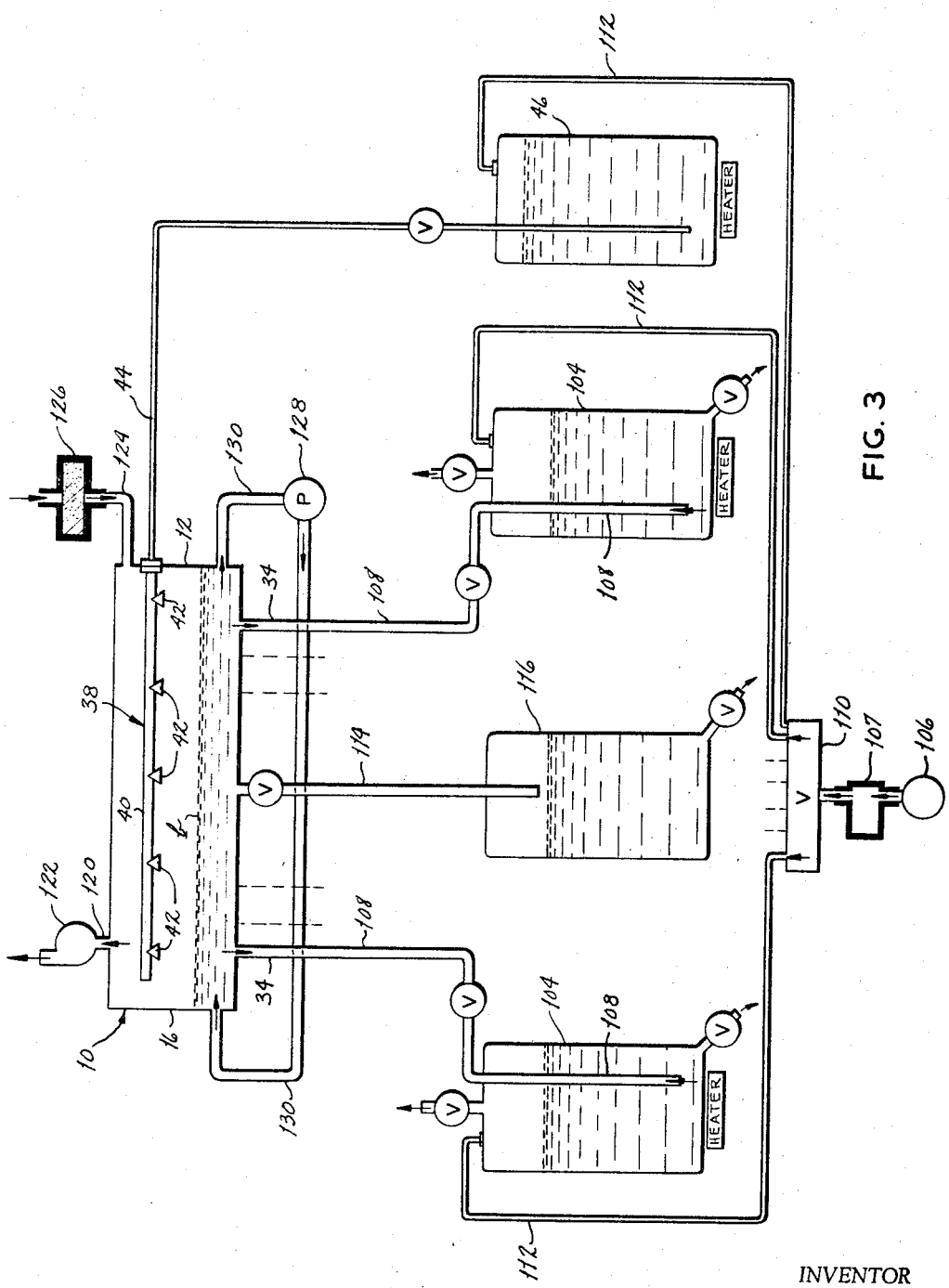
FIG. 3
INVENTOR
JOHN T. PARSONS
BY
ATTORNEY

United States Patent Office 3,420,712
Patented Jan. 7, 1969

3,420,712
METHOD FOR TREATING ELONGATED METAL WORKPIECES WITH A SUCCESSION OF TREATING LIQUIDS
John T. Parsons, Traverse City, Mich., assignor to Parsons Corporation, Traverse City, Mich., a corporation of Michigan
Filed July 10, 1964, Ser. No. 381,670
U.S. Cl. 134—33
Int. Cl. C23f 3/04; B08 9/04
4 Claims

ABSTRACT OF THE DISCLOSURE

A method is provided for cleaning and otherwise treating the inner and outer surfaces of large diameter cylindrical tubes with a succession of treating liquids within the same tank, having removable end walls. A tube is supported horizontally by sling belts, suspended from a conveyor which leads into the tank; the tank ends are then sealed in place. A succession of metal treating liquids are introduced to partly fill the tank to a level above the lowermost portion of the inner wall of the suspended tube. The sling belts are then rotated, so that the treating liquid flows over the inner and outer walls of the partly submerged tube; simultaneously the treating liquid is circulated longitudinally from one end of the tube to the other.

---

Figure 1:
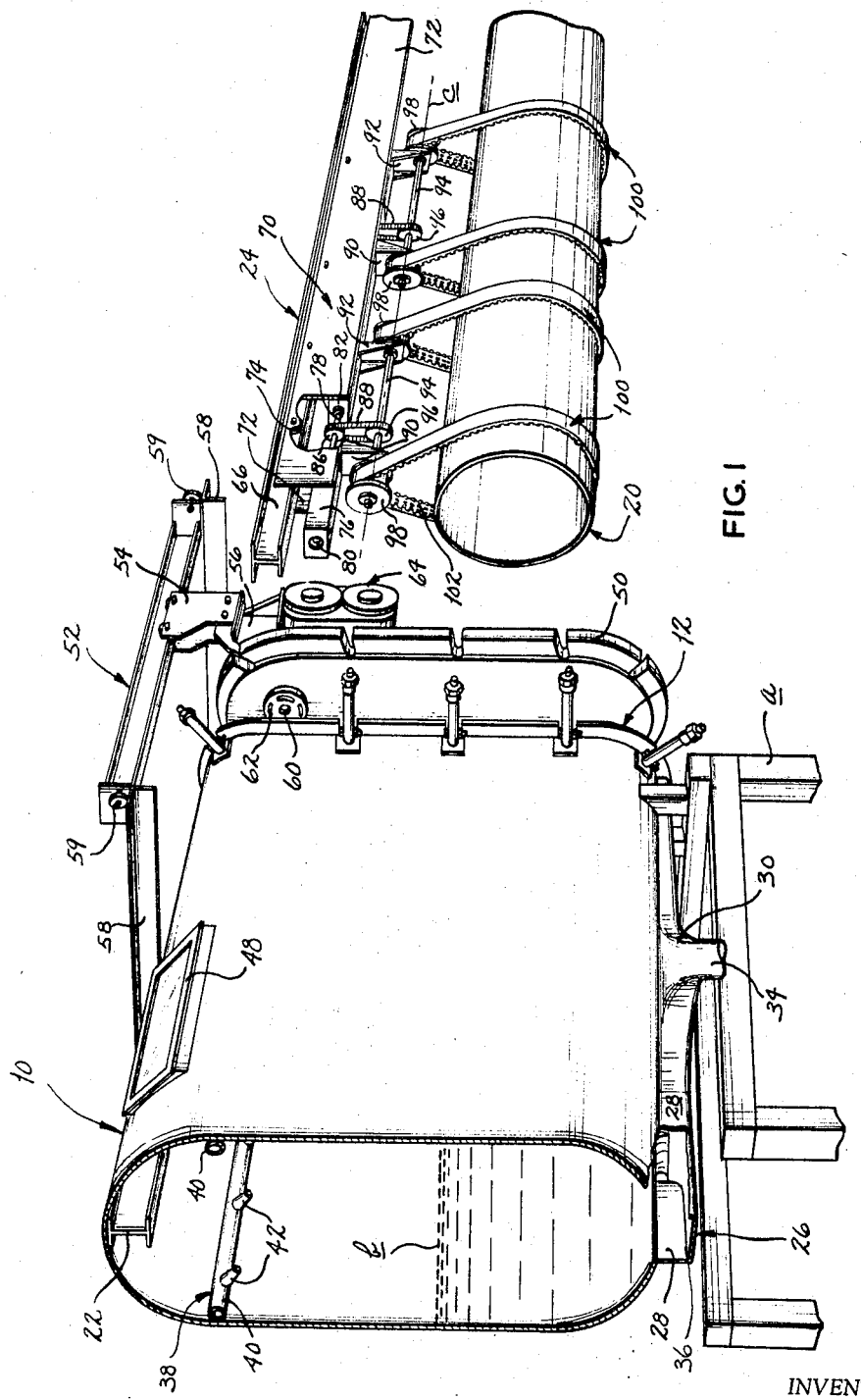

The present invention relates generally to method for treating metal workpieces, and more specifically to treating large-diameter, thin-walled metal tubes of long lengths with a succession of treating liquids, wherein damage and exposure to contamination is to be avoided.

In the field dealing with the fabrication and bonding of metal components, it is essential that means be employed to remove all foreign substances from the metal surfaces. Particular care must be taken in cleaning tubes to be employed in delivering liquid oxygen and other fuels to rocket motors of large missiles. All dust, oil and the like encountered during fabrication must be completely removed to insure proper functioning of the rocket motors. Under prior treating systems and methods, there has been excessive handling, which must inevitably result in damage to the workpiece; and the treating environment has not been carefully controlled to insure uniform and uncontaminated treatment of the tubes. For example, the tubes are often conveyed from one treating tank to another, thereby being subjected to undue jostling and contamination.

The general purpose of this invention is to provide a novel method employing a unique treating tank into which liquids are flowed in programmed sequence and in which pickling, cleaning, alodizing, pressure testing, and like treating operations are performed on workpieces suspended therein.

Specific objects of the present invention include providing a method for treating a metal workpiece with a treating liquid wherein:

The liquid may be lifted from a plurality of reservoir tanks in programmed sequence into a single processing tank and thereafter gravity-fed back to the reservoir tanks;

The liquids flow smoothly for even treatment of the metal workpiece and with so little splashing that mechanisms may be employed within the tank above the fluid level;

The required quantities of such treating liquids are minimized;

The atmosphere and contaminating gases present prior to and during the treating operation are evacuated and replaced by uncontaminated atmosphere; and Large diameter, thin-walled metal tubes are treated with a succession of treating liquids in a single processing tank, wherein the tube is supported in the same horizontal position throughout the cleaning process and thoroughly treated on its interior and exterior surfaces.

Another purpose is to provide a method of utilizing a single processing tank and a plurality of liquid storing reservoirs for treating a metal workpiece with a succession of treating liquids wherein the likelihood of contamination and damage to the workpieces is greatly decreased.

In the present invention these purposes (as well as others apparent herein) are achieved generally by providing a longitudinally extending sealable processing tank having removable, sealing end walls. A plurality of pressure-sealed reservoir tanks are positioned below the processing tank and have treating, flushing and like liquids stored therein. The reservoir tanks are connected to the single processing tank by conduits which transport the treating liquids in programmed sequence to the processing tank. This programmed sequence of liquid flow to the processing tank is accomplished by connecting selection means (which in a single embodiment may be a selector valve) to a pressure supply, such as an air compressor, whereby pressure of substantially greater magnitude than that of atmospheric pressure is selectively applied to the stored liquid in the reservoir tanks. Thus, each treating liquid to be utilized is pressure lifted from the reservoir tanks in programmed sequence, transported by means of the conduits to the processing tank where it treats the workpiece, and then returned by gravity flow to the reservoirs. Normally, flushing operations are interspersed between the treating operations.

Each of the removable end walls is suspended from a bridge crane which moves first endwise away from the tank and then laterally. Workpieces are introduced by means of a conveyor truck, whose length is nearly the full length of the tank, and which readily spans the spacing between a longitudinal track within the tank and fixed track segments spacedly adjacent to each end. The spacings of these segments are provided so as not to interfere with the tank end wall removal operation. The truck carries powered sheaves mounted on a longitudinal axis. When the truck is introduced into the tank and the end wall closed, a power drive to the sheaves, through a coupling in the end wall, rotates the tube within the treating liquid. On completion of the treating process, the other end door is removed and the treated tube is conveyed, still suspended from the sheaves, onto the track segment within a "white room."

Figure 2:
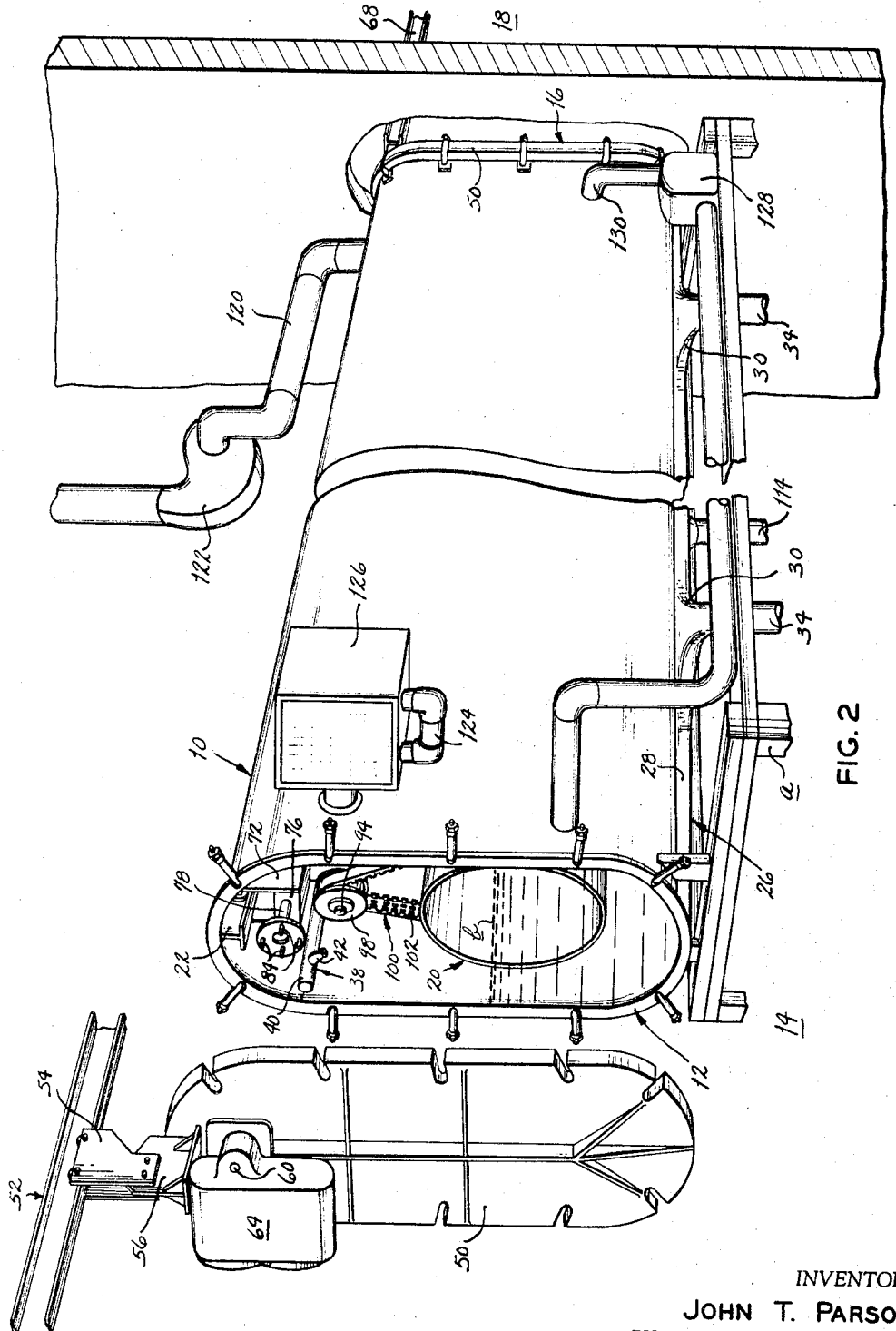

Utilization of the process of the invention will become apparent to those skilled in the art from the disclosures made in the following description of a preferred simple embodiment of the invention as illustrated in the accompanying drawings, in which:

FIG. 1 is a pictorial sketch of one end of an elongated single processing tank, with portions broken away to show the interior of the tank, also showing an end wall open, the tank's conveyor truck removed into the work room and a tube suspended from the truck in position preparatory to being introduced into the tank;

FIG. 2 is a broken perspective sketch of the processing tank of FIG. 1 with the truck therein and with the other tank end wall shown through the broken away portion of the wall which separates the work room of FIG. 1 from an uncontaminated room adjacent thereto; and FIG. 3 is a schematic equipment diagram illustrating the elements utilized in the basic fluid flow cycle and its programmed control from the several storage reservoir tanks to the single processing tank.

Referring now to the drawings, wherein like reference characters designate like or corresponding parts throughout the several views, there is shown in FIG. 1 an elongated tubular processing tank, generally designated 10, having openable and sealable end walls. The tank 10 is mounted upon a framework *a* within a work room 14, to extend longitudinally from its one openable end 12 to its other end 16 which opens into a clean uncontaminated room, sometimes called the "white room" 18. The work room 14 is of the type in which precision machinery for the fabrication of workpieces such as those designated 20 is housed. Within the same work room 14 and in close proximity to such machinery, it is desirable to install a liquid treating system for such workpieces without danger of corrosion. The processing tank 10 is generally tubular, with a rounded top and bottom and of sufficient inside dimensions to accommodate large, long workpieces 20, having a length of say 60 feet and a diameter up to about three feet. The tank 10 may be fabricated of stainless steel, or alternately it may be specially lined to resist corrosion which would otherwise result from the various treating liquids to be used in the treating operation.

Welded to the top inner surface portion of the tank 10 is a fixed conveyor track 22 which extends the full longitudinal extent of the tank from its work room end 12 to the white room end 16. The fixed conveyor track 22 may preferably be a conventional I-beam suitable for supporting conveyor means, generally designated 24, within the sealable processing tank 10.

At is bottom, the tank 10 has a narrowed, trough-like portion 26 formed by providing two supplementary sides 28 which extend downwardly from the rounded bottom of the tank 10 to a flat bottom plate joining the sides. The trough-like portion 26 increases in depth from near each end of the tank to have its greatest depth at the longitudinal center of the tank. Flared outlets 30, through both the trough sides 28 into the trough portion 26, are spaced along the full length of the tank 10. Conventional pipe conduits 34 feed into the flared outlets 30. At their juncture with the trough sides 28, the side outlets 30 feed into generally rectangular openings 36. The openings 36 allow treating liquids to be introduced from the liquid conduits 34 into the trough-like portion 26 in a manner which flows the liquid along the longitudinal length of the narrow trough 26 without impinging strongly against the sides 28. By such introduction of the liquid, the splashing and turbulence which would otherwise occur, is minimized.

Flushing means, generally designated 38, are mounted within the processing tank 10 above a fill level *b*. The flushing means 38 extends longitudinally along both inner sides of the tank 10. They consist of two flushing liquid supply pipes 40, one on each side of the tank, having spray nozzles 42 spaced along their lengths and directed to provide a spray pattern which will wash the entire inner surface contacted by the treating liquids. Connected to the supply pipes 40 is a flushing conduit 44 which delivers a flushing liquid, such as water or a neutralizer solution, from a flushing liquid reservoir 46; see FIG. 3.

Having described generally the interior of the processing tank 10, the exterior will now be described with particular reference to FIGS. 1 and 2. As may be seen, hinged steel doors 48, having transparent windows, are provided along the outer upper surfaces of the tank 10. These doors 48 open to permit inspection and sampling of the tank 10 interior and close to seal the interior from the work room 14 when the tank 10 is in operation.

Sealable end walls or doors 50 are provided at each end of the tank. One such wall is located at the open end 12 in the work room 14 and the other is received in the white room 18 which is remote from the work room 14, as indicated by the partitioning wall. These sealable end walls 50 are removable from the tank 10 by means of a movable bridge crane 52 and traversing carriage 54. The carriage 54, whose under side is bolted to a flange 56 at the top of the door 50, may travel longitudinally along the bridge crane beam toward and away from the open end 12 of the tank 10. The bridge crane 52 moves on tracks 58 and rollers 59 traversely to such longitudinal movement. The end walls 50 are removed by being first backed-off from the open ends 12 and 16 by moving the carriage 54 along the bridge crane 52. The bridge crane 52 itself is then moved laterally sideward, removing the end wall 50 from the path of a workpiece 20, which may then be introduced through the open end 12 of the tank 10. Removal from the end 16 of the tank 10, to the white room 18, is performed similarly.

Within the removable end wall 50 in the work room 14, there is mounted a powered drive 60 which extends entirely through such end wall. At its inner side the powered drive 60 is secured to releasable coupling means 62 which, in the embodiment illustrated, takes the form of a slotted clutch plate. At the outer side of the end wall 50, the powered drive 60 is engaged and driven by a motor 64 which is controlled from a central control panel (not shown). Actuation of the motor 64 energizes the powered drive 60, thereby to rotate the slotted clutch plate 62. The operation of the coupling clutch plate 62 will be more fully appreciated when taken with the description of the conveying means 24, now to be described.

Conveying means 24 for suspending and transporting the large-diameter, thin-walled workpiece 20 horizontally into and out of the processing tank 10 consists of conveyor track portions 66, 68 in the work room and white room and a conveyor truck 70. Referring to FIG. 1, the conveyor track portion 66 is of conventional I-beam construction, and is hung from the work room superstructure adjacent to the tank end 12. These conveyor track portions 66, 68 are in substantial lateral and vertical alignment with the fixed conveyor track 22 inside the tank 10 and they are longitudinally spacedly removed from the tank ends 12, 16 to provide spaces for accommodating the removal of the tank end walls 50; that is, the spaces must be at least greater than the thickness of the removable end walls 50.

The conveyor truck 70 consists principally of a pair of elongated side plate members 72 which extend nearly as long as the tank 10. Rollers 74, mounted on stub-shafts which extend inwardly from the side plate member 72, support the truck 70 for rolling movement along the lower flanges of the I-beam conveyor track 66. While a shorter truck would be utilizable for certain types of workpieces, its length must be sufficient to bridge the spaces between the outer track portions 66, 68 and the inner fixed track 22.

Secured between the side wall members 72 of the conveyor truck 70 is a hollow, rectangular member 76 which houses a longitudinally extending, motor-driven shaft 78, supported therein by bearing partitions 82. The motor-driven shaft 78 has its one end journaled for rotation in an end bearing 80 and at its other end has a disc-like plate with extending pins 84 for engaging the slots of the releasable coupling clutch plate 62. Intermediate the bearings partition 82 the motor-driven shaft 78 has sprockets 86 mounted to permit their teeth to engage the upper portions of stainless steel drive chains 88 which pass through openings in the rectangular housing member 76. Pairs of angle brackets 90, 92 extend transversely to the member 76, secured to the lower edges of the side plates 72, to support a plurality of short drive shafts 94 at spaced positions below and parallel to tthe motor-driven shaft 78. Between the ends of the drive shafts 94 are mounted sprockets 96 which engage the lower loops of the drive chains 88 to impart rotation to the drive shafts 94. Secured onto the ends of the drive shafts 94 are sheaves 98 mounted for rotation about a longitudinal axis c which is parallel to the longitudinal axis of the tube to be suspended therebelow.

Endless, sling-like belts 100, formed of a rubber which will resist the chemicals employed within the tank 10, are slipped around and depend from the rotatable sheaves 98. The belts 100 are of sufficient length to encompass the workpiece tube 20, and together they support it throughout its length without bending. So supported, the tube 20 extends horizontally, ready to be moved longitudinally and introduced through the open end 12. Upon entry of the tube 20, it is positioned in close proximity to the bottom trough-like portion 26.

Preferably the sling-like belts 100 are characterized by spaced, protruding cogs 102 which engage the outer surface of the tube 20. Being so spaced, the cogs 102 present channels in the belts through which the treating liquids may flow, to insure that no surface portion of the tube 20 is constantly covered or "masked" during treatment. The cogs 102 serve as friction contacts to grip and rotate the tube.

FIG. 3 shows the necessary conduits and connections for a simplified system, illustrated with only two storage or reservoir tanks 104. These are located immediately below the platform support of processing tank 10. These reservoir tanks 104 contain the various treating liquid solutions to clean and treat the tube 20, it being understood that any number of such tanks may be employed in the system, as indicated by the dashed lines of FIG. 3. The heated reservoir tanks 104 are fabricated of steel which may be stainless steel or lined, depending upon the liquid to be stored therein. Each tank has a capacity of approximately 4,000 gallons and stores such liquids as nitric-hydrofluoric acid, nitric acid, hydrochloric acid, water, emulsion solution, alkaline cleaning solution, alkaline etching solution, alodine solution, etc. Each tank 104 is pressure-sealed, so that by the use of low air pressure of from 5 to 8 pounds (p.s.i.) above atmospheric pressure supplied by an air compressor 106, the treating liquids may be forced from the reservoir tanks 104 up through conduits 108 into the processing tank 10 positioned directly thereabove.

The conduits 108 which connect the processing tank and the reservoir tanks 104 are conventional liquid handling pipes which are provided with conventional valves that are controllable from a remote central control panel (not shown). The conduits 108 extend into the reservoir tanks 104 to terminate in close proximity to their bottoms. At their other ends the conduits 108 feed into the treating tank conduits 34 spaced along the processing tank.

A selector valve 110 is coupled to the air compressor 106 through its accumulator 107 and has tributary air pressure leads 112 which communicate with the interior of the reservoir tanks 104 above the level of the liquids stored therein. The selector valve 110, like the other valves of the system, is controlled from the remote control panel (not shown) to selectively apply air pressure to the reservoir tanks 104. The cleaning liquids stored in the reservoir tanks 104 may thus flow through the flared passageways 36 and thence into the trough-like portion 26 of the tank 10 at a rate of approximately 1,800 gallons per minute. This pressure sealed delivery system for the treating liquids avoids the corrosive fumes; it also avoids the need for many valves which, in a conventional pump system, would be subjected constantly to corrosive liquids.

The flushing liquid reservoir 46 is also a pressure sealed tank having an air pressure lead 112 connecting it to the selector valve 110 for forcing the flushing liquids through the flushing conduits 44 and into the flushing means 38.

A centrally located drain pipe 114 leads from the trough portion 26, at the point where it has its greatest depth, downwardly to a neutralizer tank 116 in which treating liquid flushed from the reservoir tank is collected and neutralized prior to discharge into the sewage system. Advantageously the trough-like portion 26 slopes gradually from the tank ends 12, 16 to the longitudinal center of the tank to aid in flushing that portion of the treating liquid which is not drained back to its reservoir tank.

An air exit tube 120 is connected at its one end to an exhaust blower 122 and at its other end communicates with the interior of the processing tank 10 above the liquid level b. Similarly provided is an air intake tube 124 which is connected at its one end to an air intake filter 126 and at its other end communicates with the interior of the processing tank 10 above the liquid level b. Energization of the exhaust blower 122 draws or vents off the atmosphere present in the tube after sealing the end walls 50. It also operates during the treating operation to remove the corrosive fumes and replace the removed gases by uncontaminated atmosphere drawn through the air intake filter 126 and intake tube 124.

As may be seen from FIG. 2, when the liquid introduced into the processing tank 10 has reached the level b, the tube 20 is not completely submerged into the liquid. Rotation of the sheaves 98 and sling-like belts 100 by means of the motor 64, powered drive 60, motor-driven shaft 78, and chains 88, brings the outer surface of the tube 20 into contact with the treating liquid. Liquid also flows between the belt cogs 102 to the outer surface, but additional means are necessary to insure that the interior surface of the tube 20 is evenly and uniformly exposed to circulating treating liquid. Therefore, a circulation pump 128 (FIG. 3) and associated conduit 130 are provided to longitudinally circulate the treating liquid along the elongated trough-like portion of the processing tank. The longitudinal circulation of the liquid causes the liquid to pass through the interior of the tube continuously and evenly and the rotation thereof exposes the entire interior to the continuously circulated liquid.

The method of using a single processing tank and a plurality of liquid storage reservoirs for treating a metal workpiece with a succession of treating liquids will not be described. Initially the large-diameter, thin-walled metal tube is carefully hoisted from the precision machinery where it is formed. The cog belts 100 are passed over its ends and slipped in place on the sheaves 98, so that the tube 20 is supported in a horizontal position throughout its length. The removable end wall 50 of the processing tank is then backed off from the tank end 12 and then moved laterally by the bridge crane 52, out of the path of the track portions 22, 66. The tube 20 is then conveyed horizontally through the open tank end 12 and into the empty tank. The end wall or door 50 is then moved by the bridge crane 52 into place and the tank 10 is then sealed to prevent any contamination from entering the tank during the treating process and also to prevent corrosive fumes from escaping from the tank into the work room during the treating operation.

The air compressor 106 is then energized and pressure directed from the accumulator into the treating liquid storage reservoirs where it is applied to the treating liquid selected for the first cycle of operation. The treating liquid so selected is forced under the air pressure from the reservoir tank 104 and introduced into the precessing tank 10 by means of the flared openings into the trough portion 26. The introduction of the treating liquid may, as a simple illustration, be controlled by the selector valve 110 which permits it to fill to the liquid level b, thereby to partially cover the horizontally oriented tube 20 (see FIG. 2).

The treating liquid preferably fills the cleaning tank to a level which covers that portion of the tube 20 contacted by the sling-like belt 100. By rotating the horizontally suspended tube 20 and simultaneously circulating the treating liquid longitudinally along the inner surface of the tube, the liquid is brought into contact with all the tube surface area, thereby to assure complete and uniform treatment. Simultaneous with the rotating of the suspended tube 20 and circulating of the treating liquid, gases are removed from the tank and replaced by uncontaminated atmosphere. For special treatment processes or liquids, artificial atmospheric conditions may be created within the tank; for example, a compressed gas atmosphere may be provided, which may suppress excessive turbulence or vaporization in a treating liquid. The gas removal and fresh air supply are accomplished by the exhaust blower 122 and air filter 126 in the present embodiment, it being understood that other venting or air supply apparatus may be employed.

After the prescribed time interval of the first treating cycle, the processing tank 10 is thoroughly drained by gravity flow through the drain pipe 108 which was used to supply the treating liquid. Contaminants present in that treating liquid drained back to the reservoir tanks are permitted to settle to the bottom of the tanks below the lower ends of conduits 108. In this manner the conduits are unobstructed and the contaminants may be drained from the tanks at desired intervals.

After the processing tank 10 has been drained, it is repetitively flushed with a flushing solution; for example, water, and thoroughly drained through drain pipe 114 after each flushing. Upon settling out of the contaminants from the rservoir tanks, another treating cycle is initiated and the first cycle steps repeated with a different treating liquid. The number of treating cycles to which a tube is subjected varies with the type of desired treatment; for example, pickling, cleaning, chemical treating or pressure testing. A typical cleaning operation may include the following cycles for cleaning an aluminum tube to be adhesively bonded to a similar tube:

(1) emulsion cleaning
(2) water rinsing
(3) alkaline cleaning
(4) water rinsing
(5) alkaline etching
(6) water rinsing
(7) acid smut removal
(8) water rinsing After the various treating cycles have been performed, the end wall 50 located in the white room 18 is backed off from the open end 16 and removed laterally by means of a bridge crane (not shown) similar to that provided in the work room 14. The conveyor truck 70 is then moved along the fixed conveyor track 22, across the space between track 22, and onto the conveyor track portion 68. The treated tube 20 is removed from the sling-like belts 100 and readied for packaging or use under controlled conditions (such as in adhesive bonding) in the white room 14. The conveyor truck 70 is then returned into the processing tank 10 and the sealable end wall 50 in the white room 18 replaced and sealed against the open end 16. The other end wall 50 in the work room 14 may then be opened to permit the conveyor truck to return to the work room conveyor track portion 66 where the truck may be supplied with another workpiece 20.

In utilizing the method of the present invention, wherein a single processing tank and a plurality of liquid storage reservoirs are used for treatment of a metal workpiece with a succession of treating liquids, the following steps have thus been disclosed: sealing the processing tank from the atmosphere, introducing into the sealed processing tank a selected treating liquid from one of the plurality of storage reservoirs (in the embodiment illustrated by applying to the stored liquid a pressure substantially greater than atmospheric pressure), circulating the treating liquid within the tank (optionally compressing the atmosphere therein whereby the suppress turbulence of the circulating liquid), removing the gases in the tank above the liquid and simultaneously supplying an uncontaminated atmosphere into the tank to replace the removed gases, draining the treating liquid from the processing tank, conducting the treating liquid to its respective storage reservoir, settling out the contaminants from the treating liquid, spraying water or other neutralizing liquid into the tank to flush it, again draining the tank, and sequentially introducing an additional treating liquid from the storage reservoir and repeating the processing steps for each sequence.

Obviously, many modifications and variations of the present invention are possible in the light of the above teachings. It is therefore to be understood that within the scope of the appended claims, the invention may be practiced otherwise than as specifically described.

I claim:
1. The method of treating the surfaces of a relatively large diameter cylindical tube with a treating liquid, comprising the steps of
   supporting the tube horizontally at a fixed level within a tank,
   introducing into the tank a metal-treating liquid to a level above that of the lowermost portion of the inner wall of the tube so horizontally supported but below the level of the uppermost part of its said inner wall, whereby the tube is partly submerged in said liquid, and
   rotating the partly submerged tube at the fixed level at which it is so supported,
   whereby to flow the treating liquid over both the inner and outer surfaces of the tube.
2. The method as defined in claim 1, together with
   the steps of simultaneously circulating the treating liquid longitudinally from one end of the partly submerged rotating tube to the other.
3. The method as defined in claim 1, in which
   the step of supporting the tube horizontally includes the step of applying supporting sling belts around and beneath the outer tube surface, whereby to suspend same, and
   the step of rotating the partly submerged tube includes rotating such sling belts,
   whereby movement of the sling belts around and beneath the outer tube surface rotates the partly submerged tube at such fixed level.
4. The method of cleaning metal tubes defined in claim 3, in which the tank is of the type having a removable sealable end wall,
   wherein the step of supporting the tube within the tank includes the steps of
   conveying the tube, so suspended, horizontally into the tank when such end wall is so removed, and then applying and sealing the end wall of the tank in place, together with the subsequent steps of
   draining the tank, removing the end wall, and conveying the tube, so suspended, horizontally therefrom.

References Cited
UNITED STATES PATENTS

| | | | |
|---|---|---|---|
| 774,461 | 11/1904 | Wolf | 134—99 XR |
| 2,108,489 | 2/1938 | Johnson et al. | 134—22 |
| 2,322,729 | 6/1943 | Holman | 134—95 |
| 2,857,922 | 10/1958 | Effinger | 134—30 XR |
| 2,918,925 | 12/1959 | Dopler | 134—153 XR |
| 3,021,863 | 2/1962 | Low | 134—95 XR |
| 3,214,867 | 11/1965 | Henning | 134—22 XR |
| 3,354,495 | 11/1967 | Lawrence | 134—30 XR |

FOREIGN PATENTS

| | | |
|---|---|---|
| 597,213 | 1/1948 | Great Britain. |
| 822,171 | 10/1959 | Great Britain. |

MORRIS O. WOLK, *Pirmary Examiner.*

J. ZATARGA, *Assistant Examiner.*

U.S. Cl. X.R.
134—26, 34